United States Patent
Cooley et al.

(10) Patent No.: US 9,639,710 B2
(45) Date of Patent: May 2, 2017

(54) DEVICE-BASED PIN AUTHENTICATION PROCESS TO PROTECT ENCRYPTED DATA

(71) Applicant: Symantec Corporation, Mountain View, CA (US)

(72) Inventors: Shaun Cooley, Mountain View, CA (US); Brian Powell, El Segundo, CA (US); Srinivas Chillappa, Culver City, CA (US); Michael W. Lo, Rowland Heights, CA (US); Mahesh Kamsala, Sherman Oaks, CA (US)

(73) Assignee: Symantec Corporation, Mountain View, CA (US)

( * ) Notice: Subject to any disclaimer, the term of this patent is extended or adjusted under 35 U.S.C. 154(b) by 294 days.

(21) Appl. No.: 14/139,204

(22) Filed: Dec. 23, 2013

(65) Prior Publication Data

US 2015/0178515 A1  Jun. 25, 2015

(51) Int. Cl.
  *G06F 21/62* (2013.01)
  *H04L 29/06* (2006.01)
  *G06F 21/31* (2013.01)

(52) U.S. Cl.
  CPC .......... *G06F 21/6218* (2013.01); *G06F 21/31* (2013.01); *H04L 63/0428* (2013.01); *H04L 63/06* (2013.01); *H04L 63/083* (2013.01)

(58) Field of Classification Search
  CPC ..... G06F 21/6218; G06F 21/602; H04L 63/06
  USPC ....................................................... 713/155
  See application file for complete search history.

(56) References Cited

U.S. PATENT DOCUMENTS

| | | | | |
|---|---|---|---|---|
| 5,418,854 A | * | 5/1995 | Kaufman | G06F 21/335 380/28 |
| 5,436,972 A | * | 7/1995 | Fischer | G06F 12/1408 380/286 |
| 5,721,780 A | * | 2/1998 | Ensor | G06F 21/31 340/5.85 |
| 5,764,772 A | * | 6/1998 | Kaufman | H04L 9/088 380/286 |
| 5,937,066 A | * | 8/1999 | Gennaro | H04L 9/0841 380/286 |
| 6,044,155 A | * | 3/2000 | Thomlinson et al. | 713/155 |
| 6,389,535 B1 | * | 5/2002 | Thomlinson et al. | 713/165 |
| 6,539,479 B1 | * | 3/2003 | Wu | H04L 9/0844 380/227 |
| 8,225,109 B1 | * | 7/2012 | Kalligudd | G06F 11/1456 380/255 |

(Continued)

OTHER PUBLICATIONS

Merriam-Webster, "salt", 2015.*

(Continued)

*Primary Examiner* — O. C. Vostal
(74) *Attorney, Agent, or Firm* — Patterson + Sheridan, LLP

(57) ABSTRACT

Techniques are disclosed for providing a device-based PIN authentication process used to protect encrypted data stored on a computing system, such as a tablet or mobile device. A client component and a server component each store distinct cryptographic keys needed to access encrypted data on the client. The mobile device stores a vault encryption key used to decrypt encrypted sensitive data stored on the mobile device. The vault key is encrypted using a first encryption key and stored on the mobile device. The first encryption key is itself encrypted using a second encryption key. The second encryption key is derived from the PIN value.

14 Claims, 8 Drawing Sheets

(56) References Cited

U.S. PATENT DOCUMENTS

| | | | |
|---|---|---|---|
| 8,254,571 B1* | 8/2012 | Boyen | 380/44 |
| 8,572,389 B2* | 10/2013 | Little | G06F 21/6245 380/277 |
| 8,667,568 B2* | 3/2014 | Schneider | G06F 21/46 713/182 |
| 8,751,804 B1* | 6/2014 | Nystrom | H04L 63/0428 713/168 |
| 8,788,815 B1* | 7/2014 | Garcia | H04L 63/061 713/165 |
| 9,146,881 B2* | 9/2015 | Cousins | G06F 12/1408 |
| 9,330,245 B2* | 5/2016 | Maron | G06F 21/31 |
| 2003/0084287 A1* | 5/2003 | Wang | H04L 63/0428 713/168 |
| 2006/0053112 A1* | 3/2006 | Chitkara et al. | 707/9 |
| 2007/0022469 A1* | 1/2007 | Cooper et al. | 726/3 |
| 2007/0165844 A1* | 7/2007 | Little | G06F 21/6245 380/30 |
| 2007/0192601 A1* | 8/2007 | Spain et al. | 713/168 |
| 2008/0005577 A1* | 1/2008 | Rager | G06F 21/575 713/183 |
| 2009/0217385 A1* | 8/2009 | Teow | G06F 21/604 726/27 |
| 2009/0307474 A1* | 12/2009 | Johnston | G06F 21/572 713/2 |
| 2010/0290623 A1* | 11/2010 | Banks | G06F 21/6227 380/277 |
| 2011/0126023 A1* | 5/2011 | Wang | G06F 21/6209 713/182 |
| 2011/0185186 A1* | 7/2011 | Adams | H04L 9/0891 713/189 |
| 2012/0151219 A1* | 6/2012 | Ryu et al. | 713/185 |
| 2013/0013921 A1* | 1/2013 | Bhathena | H04L 9/0825 713/168 |
| 2013/0014248 A1* | 1/2013 | McLaughlin et al. | 726/17 |
| 2013/0067217 A1* | 3/2013 | Matzkel et al. | 713/155 |
| 2013/0136356 A1* | 5/2013 | Hughes | H04N 1/603 382/167 |
| 2013/0145447 A1* | 6/2013 | Maron | G06F 21/31 726/6 |
| 2013/0159704 A1* | 6/2013 | Chandrasekaran | 713/156 |
| 2013/0166918 A1* | 6/2013 | Shahbazi et al. | 713/183 |
| 2013/0166920 A1* | 6/2013 | Cousins | G06F 12/1408 713/189 |
| 2013/0185557 A1* | 7/2013 | Renganathan | G06F 21/64 713/168 |
| 2013/0219166 A1* | 8/2013 | Ristov | H04L 63/0853 713/151 |
| 2014/0149746 A1* | 5/2014 | Yau | G06F 21/35 713/185 |
| 2014/0169554 A1* | 6/2014 | Scarisbrick | H04L 9/0863 380/28 |
| 2014/0331294 A1* | 11/2014 | Ramallo et al. | 726/5 |

OTHER PUBLICATIONS

Bansal et al., "Keys to the Cloud: Formal Analysis and Concrete Attacks on Encrypted Web Storage", 2013.*
Chou et al., "Client-side defense against web-based identity theft", 2004.*
Denning, "Passwords", 1992.*
Dhanalakshmi et al., "Deteection of Phishing Websites and Secure Transactions", 2011.*
Khayal et al., "Analysis of Password Login Phishing Based Protocols for Security Improvements", 2009.*
Kuacharoen, "A Practical Customer Privacy Protection on Shared Servers", 2010.*
Lee et al., "A Password Stretching Method using User Specific Salts", 2007.*
Liu et al., "Introducing Secure Data Transmission Scheme in a Heterogeneous Environment", 2013.*
Mitchell, "Using MD5 to Encrypt Passwords in a Database", 2010.*
Namdev et al., "A Novel Approach for SQL Injection Prevention Using Hashing & Encryption (SQL-ENCP)", 2012.*
Newman et al., "Salted Challenge Response Authentication Mechanism (SCRAM) SASL and GSS-API Mechanisms", RFC 5802, 2010.*
Provos et al., "A Future-Adaptable Password Scheme", 1999.*
Scott, "Replacing Username/Password with Software-only Two-Factor Authentication", 2012.*
Silva et al., "A SRP Based Handler for Web Service Access Control", 2004.*
Snyder, "Ethical Hacking and Password Cracking: A Pattern for Individualized Security Exercises", 2006.*
Tayloer et al., "Using the Secure Remote Password (SRP) Protocol for TLS Authentication", RFC 5054, 2007.*
Wu, "The SRP Authentication and Key Exchange System", RFC 2945, 2000.*
Zhao et al., "All Your Browser-saved Passwords Could Belong to Us: a Security Analysis and a Cloud-based New Design", 2013.*

\* cited by examiner

DEVICE-BASED PIN AUTHENTICATION PROCESS TO PROTECT ENCRYPTED DATA

BACKGROUND

Field

Embodiments of the invention generally relate to techniques for securely using a PIN to authenticate a user accessing encrypted data on a computing device, which would otherwise only be accessible using a long and complex password.

Description of the Related Art

Protecting access to user data is a well known issue in a broad variety of contexts. For example, it is common for computing applications to require users to provide a username and password. As more computing applications are accessed in a distributed manner, e.g., by accessing applications hosted in a cloud based environments, simple passwords frequently provide inadequate security. That is, passwords suffer from a number of known drawbacks. For example, passwords may be forgotten, guessed, or otherwise disclosed or obtained. Further, as computing devices have proliferated from standalone desktop systems to a variety of internetworked devices such as laptops, tablets, mobile telephones, gaming consoles, etc., the amount of sensitive data stored on computing systems and across computer networks has grown accordingly.

As is well known, security mechanisms used to protect data frequently come at the expense of convenience. That is, typically, systems that provide high degrees of security are inconvenient and systems that are convenient are usually insecure. For example, applications used to secure sensitive data on a mobile device (e.g., passwords, account numbers, etc.) typically require users supply a complex password to store or access sensitive data. Such applications may enforce rules to ensure that a password has minimum strength (i.e. by requiring mixed case, numbers, use of special characters, minimum length, etc.). The resulting passwords can be inconvenient for users to enter on mobile devices (e.g., computing tablets and smart phones), which have smaller keyboards and screens.

While a complex password may be effective at protecting access to data or applications, it can be cumbersome for users to enter on the keyboard of a mobile device. Furthermore, mobile devices frequently allow a single application to run in the foreground. On such devices, a mobile operating system can kill background applications in to conserve memory/power for a foreground application or other higher priority tasks. As a result, when switching between applications, a user may be prompted to repeatedly enter a complex password multiple times to access data.

At the same time, storing sensitive information such as passwords, credit card numbers, account numbers, digital certificates and keys, etc., is highly convenient. Further, as the amount of such sensitive information, as well as other applications which require strong security mechanisms become more common (e.g., mobile payment systems), the need to protect sensitive information stored on mobile devices will continue to expand.

SUMMARY

Embodiments presented herein include a method for securely storing encrypted data on a computing device. This method may generally include receiving a data encryption key. The data encryption key is generally used to encrypt data on the computing device. This method may also include encrypting the data encryption key using a first encryption key, storing the encrypted data encryption key on the computing device, and encrypting the first encryption key using a second encryption key. The second encryption key is derived from a user-supplied value entered on the computing device. This method may also include sending the encrypted first encryption key to a remote server.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
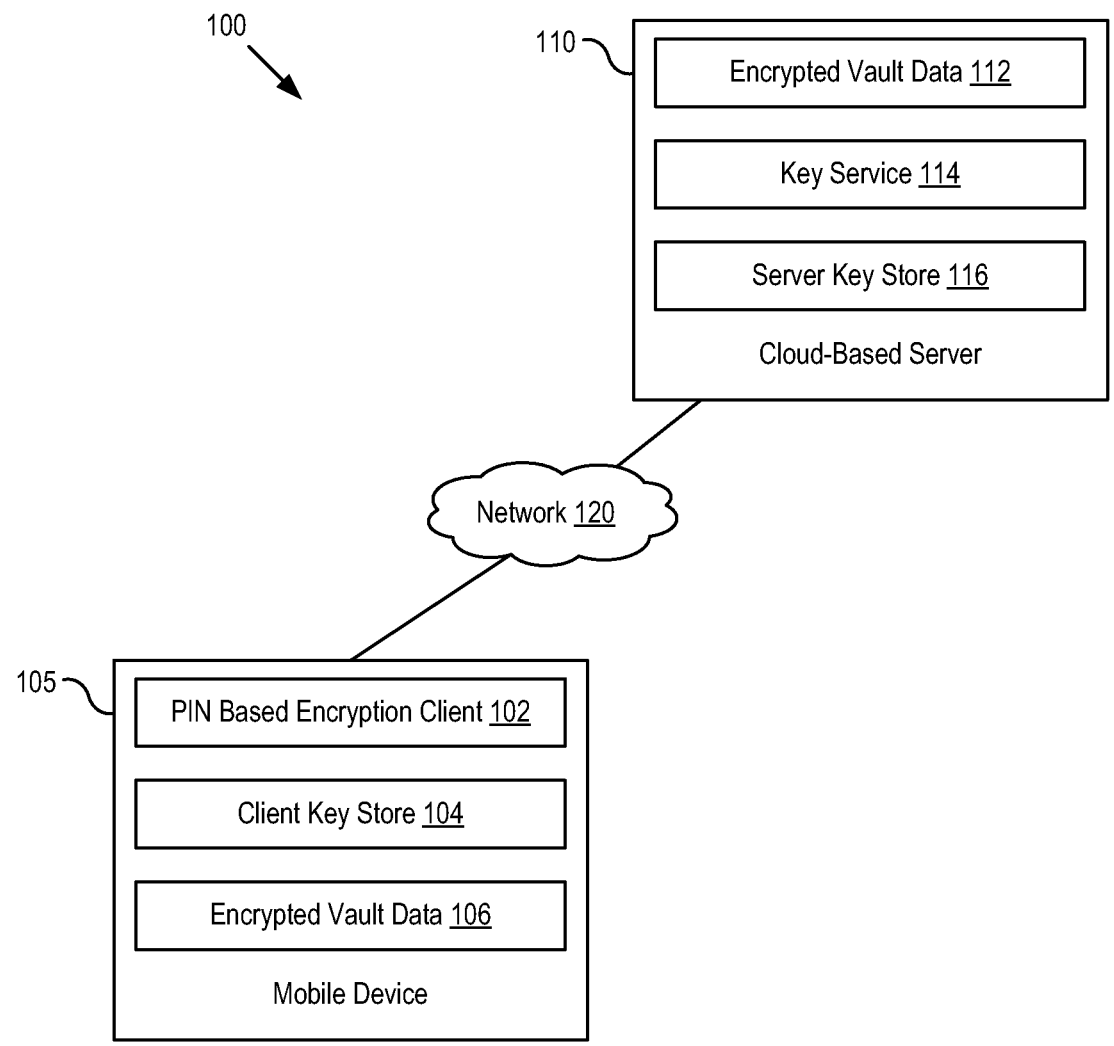
FIG. 1 illustrates an example computing environment used to provide a device-based PIN authentication process to protect encrypted data, according to one embodiment.

Embodiments presented herein provide a device-based PIN authentication process that may be used to protect encrypted data stored on a computing system, e.g., a tablet or mobile device. Rather than require a user to supply a complex password each time the user needs to access the encrypted data, the user can simply supply a PIN, such as a 4-digit numeric value. At the same time, the PIN is used as part of a highly-secure cryptographic process that ensures, while accessible to the user via the PIN, the encrypted data is stored securely on the computing system. As described more fully below, embodiments presented herein split key data between the client and server, using a PIN/device combination as the lookup key, for data on the server.

In one embodiment, a client component and a server component each store distinct components needed to access the encrypted data on the client. The client may be a mobile device without a conventional keyboard, but can be also be a desktop PC, laptop, tablet, gaming console, or other computing device capable of storing encrypted data and communicating over a network. The server is a trusted backend configured to provide data to the client.

To configure the client system to use the PIN authentication mechanism described herein, the user first establishes a trusted relationship with the device. Typically, this includes creating (or providing) a complex password. That is, to configure the PIN based authentication system, the user first authenticates themselves using a strong password. Once authenticated, the user supplies a PIN value. In addition, the client generates a set of encryption keys.

First, the client generates a data encryption key used to encrypt sensitive data stored on the client device (referred to herein as a "vault key"). In one embodiment, the vault key may be derived from the complex password, e.g., using a key derivation function, such as PBKDF2 or scrypt, etc. Additionally, the PIN is combined with a salt and used as input to a key derivation function. The resulting bytes are used as a PIN lookup key (PID) along with a device ID. The PID key, along with a device ID, may be used by the server as a device specific lookup combination. The device key may be generated as random data.

The client also generates a PIN encryption key (EK1) (using random data) and a second key (EK2) used to encrypt the PIN encryption key (EK1). The second key (EK2) may be generated using the PIN and SALT as input to a password based key derivation function to generate key source bytes. The resulting bytes are used to create the second key (EK2), which is used to encrypt the PIN encryption key (EK1). The key source bytes also provide an HMAC used to validate the integrity of data encrypted using EK2.

The vault key is encrypted with PIN encryption key (EK1) and stored on the client. The encrypted vault key may also be stored with an HMAC of the encrypted value to ensure its integrity. The device ID/PID keys are sent to the server. Additionally, the second key (EK2) is used to encrypt the PIN encryption key (EK1) and signed using the key source bytes. The encrypted PIN encryption key (encrypted EK1) is sent to the server. Note, the ID, PID, and encryption keys may be sent to the server as part of a single transaction.

By storing the encrypted PIN encryption key on the server, protections such as rate limiting can be used to prevent a brute force attack on the PIN. A brute force attack on the full encryption is still possible, but by choosing sufficiently large key sizes, is computationally infeasible. Access to the server can also be protected by user credentials (e.g., a complex password). Additional protection measures can include a rotating salt, remote deletion of the server data, lockout or deletion of data after a configurable number of unsuccessful attempts, and the use of HMAC digital signatures. These help mitigate attacks on the client, as well as the server. Note, in any case, the complex password can always be used as an alternative to the PIN.

Embodiments of the invention are described below using a mobile device (e.g., a mobile telephone) as an example of a computing system configured to use a device-based PIN authentication process to protect encrypted data. One of ordinary skill in the art will recognize that embodiments of the invention may be adapted to work with a variety of computing devices used to store sensitive data. For example, a game console or a streaming video device may prompt a user to provide a pin keyed in on a display screen as an alternative to spelling out a complex password using a screen-based keyboard and a remote control. Further, embodiments are described below using specific key sizes, encryption algorithms, and signing functions as examples of a device-based PIN authentication process. One of ordinary skill in the art will recognize that these examples are used to illustrate embodiments of the invention and are not limiting thereof. Further still, while described using a numeric PIN value, one of ordinary skill in the art will recognize that the PIN value could be replaced with other information input to a mobile device, e.g., a biometric value, a gesture performed on a touch screen of a mobile phone, or a short text phrase (insufficient to serve as a complex password), etc.

FIG. 1 illustrates an example computing environment 100 used to provide a device-based PIN authentication process to protect encrypted data, according to one embodiment. As shown, the computing environment 100 includes a mobile device 105 and a server 110, each connected to a network 120 (e.g. the internet). Additionally, the client includes a PIN based encryption client 102, a client key store 104, and encrypted vault data 106, and the server 110 includes encrypted vault data 112, a key service, and a server key store 116. While shown as being hosted on a common server, the key service, key store and vault data may be hosted by distinct computing systems (virtual or physical) in a data center.

In one embodiment, the PIN based encryption client 102 provides one or more applications configured to encrypt/decrypt data, generate keys, random values, and perform cryptographic signing functions, as described herein, and client key store 104 stores key values, salt values, and encrypted key values, etc. For example, in one embodiment, the encryption client 102 is configured to generate a data encryption key used to encrypt sensitive data, e.g., passwords, credit card numbers, etc., stored on the mobile device 105, shown in FIG. 1 as encrypted vault data 106. The data encryption key—referred to as a vault key (VK)—may be derived from a complex password supplied by a user.

The user also supplies a PIN value (e.g., a 4 digit numeric sequence) used to generate additional encryption keys. The encryption client 102 generates a PIN encryption key (EK1) as a 32 byte random value. The PIN (and a random 256 byte salt) may be used to generate an encryption key (EK2) used to encrypt the PIN encryption key (EK1). The encryption client 102 generates encryption key EK2 using a password based key derivation function (e.g., PBKDF2) to generate key source bytes (e.g., 55 bytes of data generated using 10,000 iterations of the PBKDF2 function). In one embodiment, 32 bytes of the key source bytes are used as the encryption key (EK2) and the remaining 23 bytes are used as a PIN HMAC key (HK).

The encryption client 102 encrypts the vault key (VK) with the PIN encryption key (EK1), signs it with the HMAC key (HK) and stores the resulting encrypted package in the client key store 104, along with the HMAC signature of the encrypted package, the initialization vector, and the PIN salt. Further, the PIN key (EK1) is itself encrypted using the encryption key (EK2) and signed using the HMAC key (HK). The resulting encrypted payload is sent to the server 110. As a result, the key used to encrypt the vault key (EK1) is not retained in client key store 104 (or otherwise stored on device 105). Instead, this key (EK1) is sent to the key server 114, which stores it in server key store 116. Thus, to access the encrypted vault data using a brute force attack on the mobile device 105 requires breaking either the PIN encryption key (EK1) or the vault key (VK), both of which are strong keys, not susceptible to a brute force attack.

In addition, the encryption client 102 generates a device lookup key (PID) from the PIN value (and salt). For example, the PID key may be a 32 byte value generated from the PIN and salt value using 10,000 iterations of PBKDF2. The PID key (along with a random device ID) is used by the server to authoritatively identify the mobile device 105. The device key is stored on the client device as well as sent to the server. The PID is sent to the server and not stored in the key store 104.

After this configuration is complete, to access the encrypted vault data, a user first supplies the PIN value. In response, the encryption client 102 regenerates the PID key and provides this key, along with the device ID to the key service 114. In turn, the key service 114 uses the PID key and the device key as a lookup to identify the encrypted package stored in server key store 116, i.e., to identify the package storing PIN key (EK1) encrypted using the encryption key EK2. Provided this occurs, the key service 114 returns the encrypted package to the mobile device 105. Once received, the client 102 regenerates EK2 (from the PIN value and salt) and uses EK2 to recover the PIN key (EK1) from the package received from the key service 114. In turn, this key (EK1) is used to decrypt the encrypted vault key (VK) stored in the client key store 104, which is then used to access encrypted vault data 106.

Should an attacker attempt to brute force the PIN value from the mobile device 105, e.g., the server 110 can rate limit requests for the encrypted package based on the device ID, as well as lockout the PIN-based authentication process after a specific number of failed attempts (instead requiring the complex password to reset the system). Further, even a successful brute force of the PIN value to obtain EK2 does not compromise the system, as the device 105 does not store anything encrypted to this key.

Note, as shown, the server 110 also store encrypted vault data 112. In one embodiment the server 110 may store a copy of encrypted vault data 112, allowing the "vault" on the mobile device 105 to by synchronized across other devices (e.g., a user could synchronize encrypted vault data across a mobile telephone and a tablet). In such a case, the server key store 116 may also store a challenge key used to challenge a client requesting the encrypted vault data 112 stored on the server 110. In one embodiment, the challenge key is created is created when the user registration process, i.e., when a user creates a new vault. When requested, the key service 114 then challenges a requesting client to decrypt the encrypted package containing the challenge key. If done successfully, the client 102 can then return the correct random value to the server 110. While the key EK2 is subject to a brute force attack against the PIN value, requests for encrypted vault data 112 (and resulting challenges) can both be rate limited by the server as well as subject to a lockout after a failed number of attempts.

Additionally, in one embodiment, the salt used with the PIN value to create the encryption keys discussed above may be rotated after each successful PIN login. That is, when the user supplies the PIN to obtain the encrypted copy of EK1 from the server 110, a new salt value may be generated and used (with the unchanged PIN value) to generate replacement EK2 and PID keys. Doing so further enhances the security of the device-based pin authentication process disclosed herein.

Figure 2:
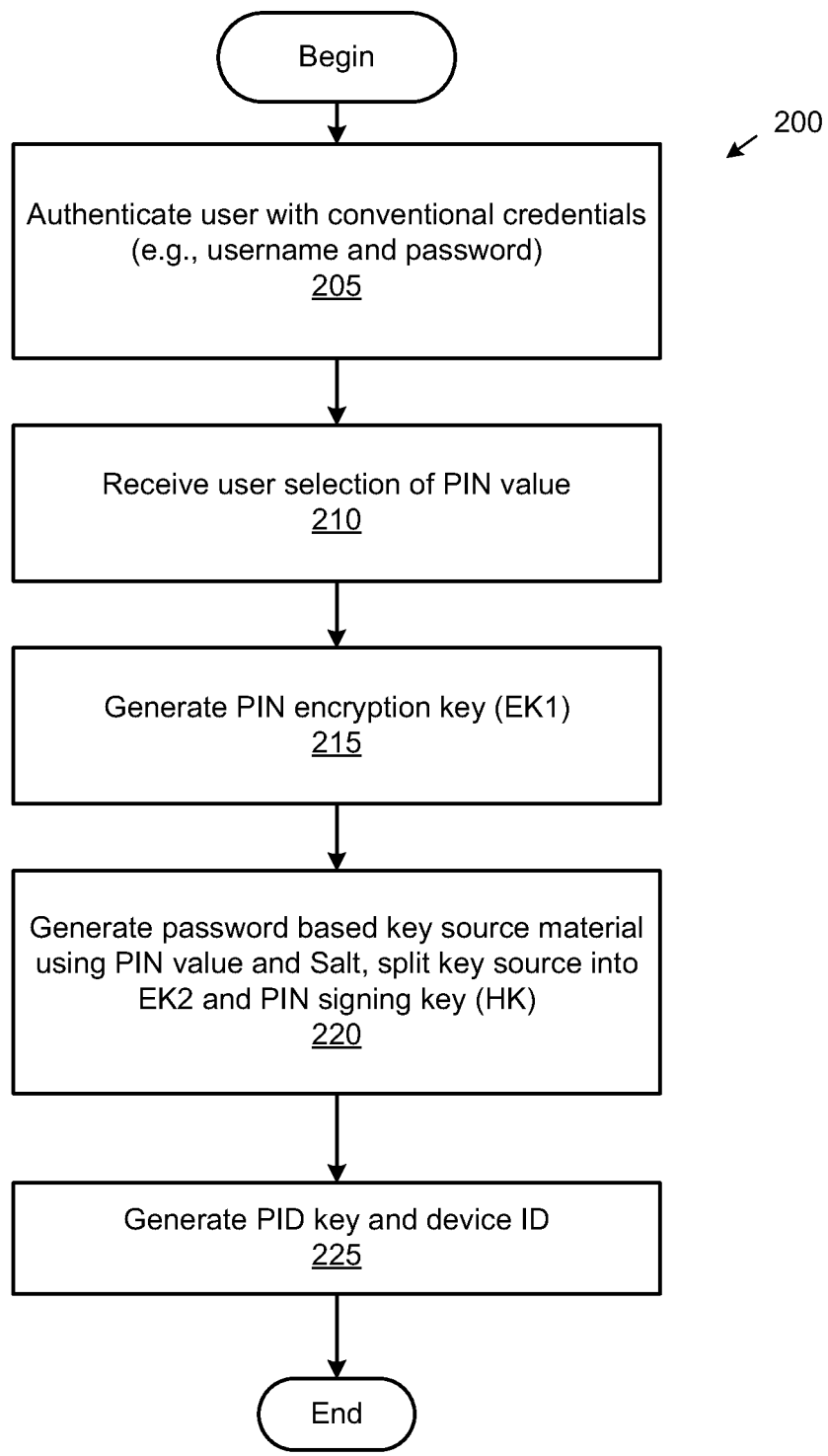
FIG. 2 illustrates a method for generating a data key and related PIN encryption key source material, according to one embodiment.
Figure 3:
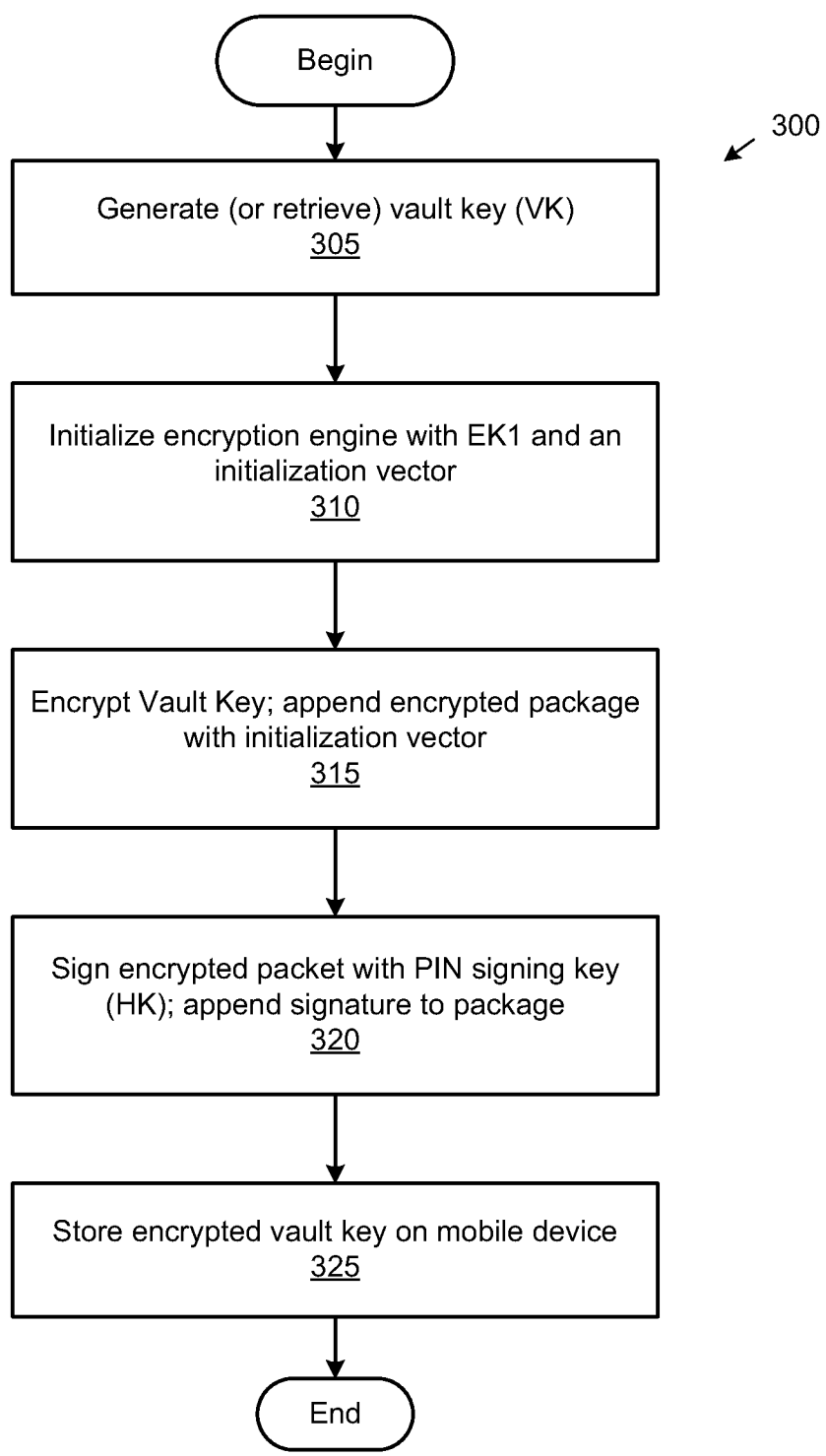
FIG. 3 illustrates a method for encrypting a vault key stored on mobile device as part of a device-based PIN authentication process to protect encrypted data, according to one embodiment.
Figure 4:
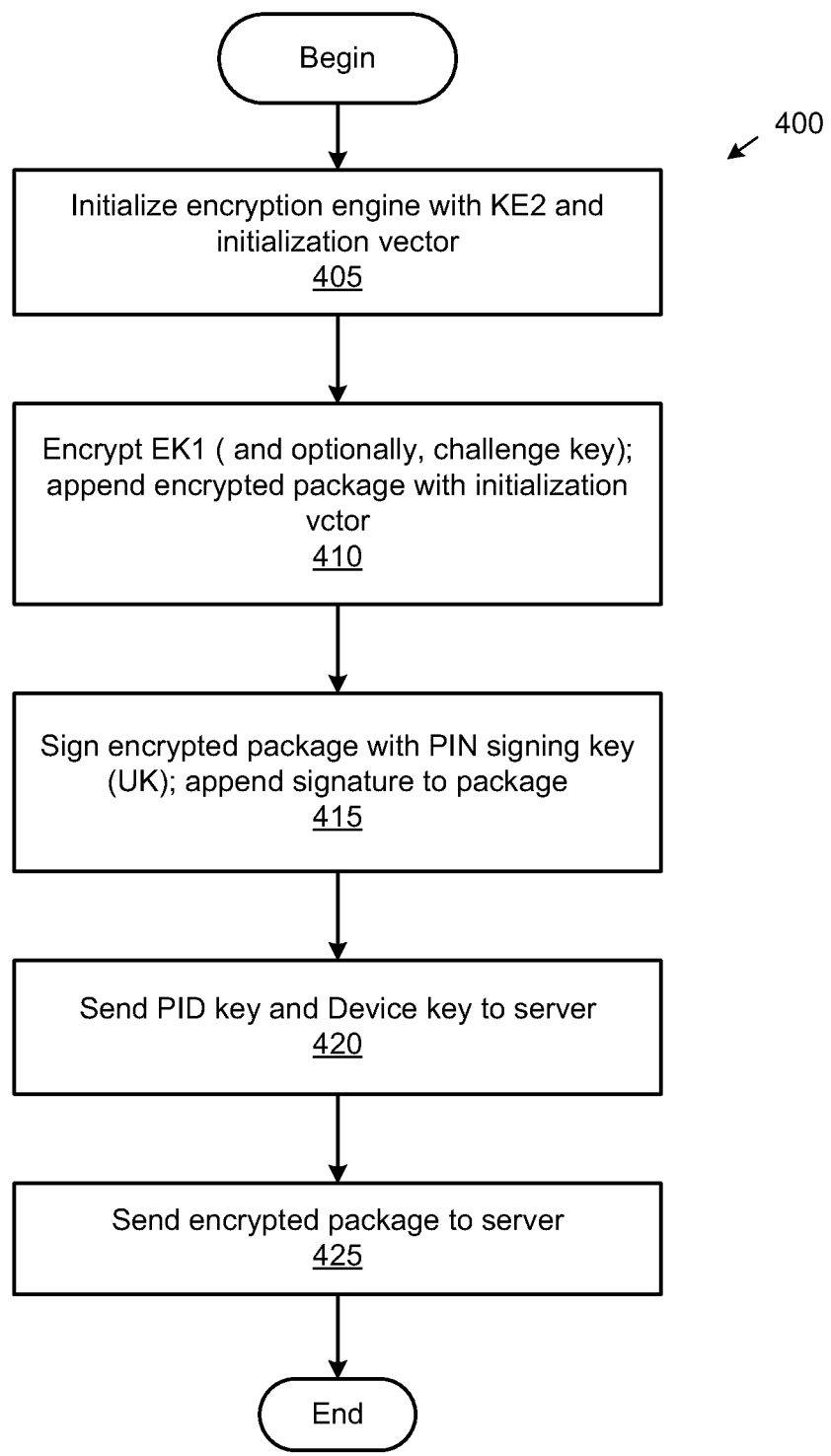
FIG. 4 illustrates a method for storing an encryption key on a server as part of a device-based PIN authentication process to protect encrypted data, according to one embodiment.

FIGS. 2-4 illustrate methods used to configure a mobile device to perform the device-based PIN authentication process described above. First, FIG. 2 illustrates a method 200 for generating a data encryption key and related PIN encryption key source material, according to one embodiment. As shown, the method 200 begins at step 205 where a mobile device authenticates a user, e.g., based on a username and a strong password. Once authenticated, the mobile device receives a user selection of a PIN value. For example, the mobile device may prompt the user to enter (and confirm) a 4-digit numeric sequence. Alternatively, the mobile device could prompt the user to supply biometric data, a gesture pattern on a mobile touch screen, or insecure text-password, etc.

Once the PIN value is supplied, at step 215, the mobile device generates a PIN encryption key (EK1). In one embodiment, the PIN encryption key (EK1) is generated as 32 bytes of random data. Further, the PIN encryption key (EK1) is generated each time a user configures a PIN value, but does not change so long as the PIN value remains unchanged. At step 220, the mobile device generates key source material from the PIN value. The key source material provides a source of bytes for a key used to sign the encrypted vault key and bytes for an encryption key (EK2) used to encrypt PIN key EK1. In one embodiment the key source material is regenerated after each successful PIN login. As noted, the key source material may be generated based on a PIN value and a salt input to a password based key derivation function, e.g., PBKDF2. For example, PBKDF2 may be used to generate a 55 byte value over 10,000 iterations as the key source bytes. In such a case, 32 bytes may be used as an encryption key (EK2) and the remaining 23 bytes used as an HMAC key (HK).

At step 225, the mobile device generates a PIN lookup key (PID) from the PIN and salt value. For example, PBKDF2 may be used to generate a 32 byte value over 10,000 iterations to use as the PID key. A new PID value may be generated after every successful PIN login. In addition, the mobile device generates a device ID, e.g., as a 32 byte random value. The PIN salt, device ID, initialization vector, vault key (encrypted with EK1), and associated HMAC are stored on the mobile device.

FIG. 3 illustrates a method 300 for encrypting a vault key stored on mobile device as part of a device-based PIN authentication process to protect encrypted data, according to one embodiment. As shown, the method 300 begins at step 305 where the mobile device generates (or retrieves) a vault key. The vault key is used to encrypt sensitive data (e.g. passwords, credit card numbers, encryption keys, or other sensitive data) stored on the mobile device. In one embodiment, the vault key may be generated from a complex password using a password based key derivation function. Alternatively, the vault key may be a random value, e.g., a random 55 byte value where 32 bytes are used to encrypt vault data and 23 bytes are used as a signing key to verify the integrity of encrypted vault data. The vault key is typically generated once per vault lifetime.

At step 310, the mobile device initializes an encryption engine with EK1 and an initialization vector (e.g., 16 bytes of random data). In one embodiment, encryption engine may be configured to encrypt data using the AES (Advanced Encryption Standard) established by the U.S. National Institute of Standards and Technology (NIST). Of course, any suitable key-based encryption algorithm may be used. At step 315, the encryption engine encrypts the vault key and appends the resulting encrypted package with the initialization vector. At step 320, the encryption engine signs the appended package with the HMAC key (HK) generated from the PIN key source bytes. For example, the encrypted vault key may be signed using the HMAC-SHA1 or HMAC-SHA256 standards using the HMAC key as the signing key. Of course, any suitable key-based digital signature algorithm may be used. At step 325, the signed package containing the encrypted vault key is stored in a key store on the mobile device.

FIG. 4 illustrates a method 400 for storing an encrypted PIN encryption key (EK1) on a server as part of a device-based PIN authentication process to protect encrypted data, according to one embodiment. As shown, the method 400 begins at step 405, where the mobile device initializes an encryption engine with an encryption key (EK2) and an initialization vector (e.g., 16 bytes of random data). As noted, EK2 comprises an encryption key generated based on the PIN value and current salt using a password based key derivation function. At step 410, the encryption engine encrypts EK1 (and, optionally, a challenge key received from the server), e.g., using the AES encryption standard. The resulting encrypted package is appended with the initialization vector and signed using the HMAC key (HK) generated from the PIN key source bytes (step 415). At steps 420 and 425, the mobile device sends the PID key and device ID to the server. The mobile device retains the device ID in a client key store, but discards the PID key (instead regenerating it when needed based on the PIN and salt values). As part of this step, the mobile device also sends the signed, encrypted package storing EK1 to the server. That is, the PID and device ID, along with the encrypted package storing EK1 are sent to the server as single, atomic transaction to prevent only part of the data from being stored. The mobile device then wipes EK1 from memory.

Figure 5:
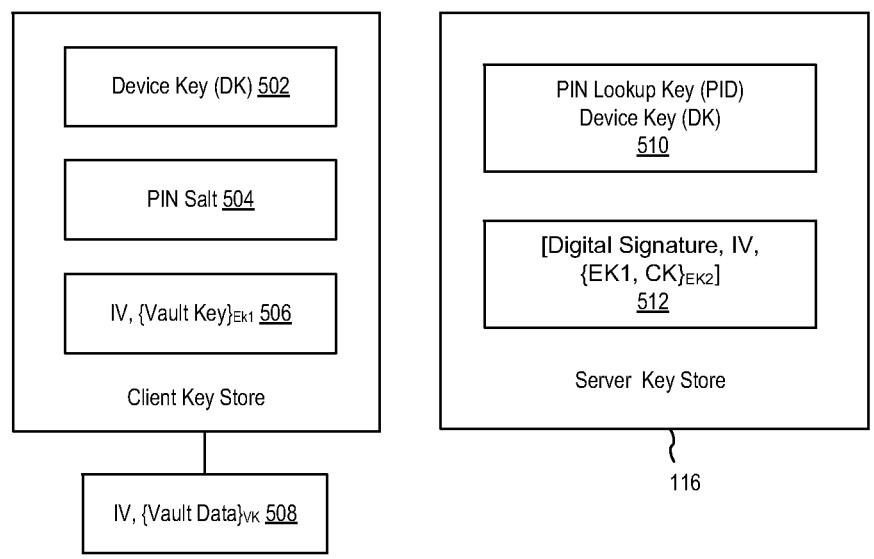
FIG. 5 illustrates a key store on a mobile device and a remote server, according to one embodiment.

FIG. 5 further illustrates the key store 104 on a mobile device and the key store 116 on a remote server first shown in FIG. 1, according to one embodiment. More specifically, FIG. 5 illustrates a distribution of keys, key material, and related data values between the mobile device and the server after performing the configuration methods of FIGS. 2, 3, and 4. As shown, the client key store 104 (on mobile device) stores the device key (DK) and current PIN salt 504. As noted, the device key is created from random data per PIN creation setup and the PIN salt is rotated each time the PIN is used to access the encrypted vault key from the server. In addition, the client key store 104 stores the encrypted vault key 506 needed to access encrypted vault data 508. The vault key 506 has been encrypted using the encryption key EK1 (and an initialization vector). The vault data 508 is encrypted using the vault key (VK) (and another initialization vector). Importantly, the encryption key (EK1) used to encrypted the vault key (VK) is not accessible in the client key store 104.

Also as shown, the server key store 116 stores the current PIN lookup key (PID) 510 and the device key (DK). The PIN lookup key (PID) is generated after every PIN login. The server key store 116 also stores an encrypted PIN encryption key (EK1) 512 (along with an initialization vector and, optionally, an encrypted challenge key). To request the encrypted copy of the PIN encryption key (EK1) 512 from the server, the mobile device prompts the user to supply the PIN value, from which the PID lookup key is regenerated. The mobile device provides the resulting PID lookup key and existing device key to the server key service. In turn the server key service matches this information within the server key store 116. If a match is found, then the server returns the corresponding encrypted copy of the PIN key (EK1) 512 to the mobile device, as further shown in FIG. 6.

Figure 6:
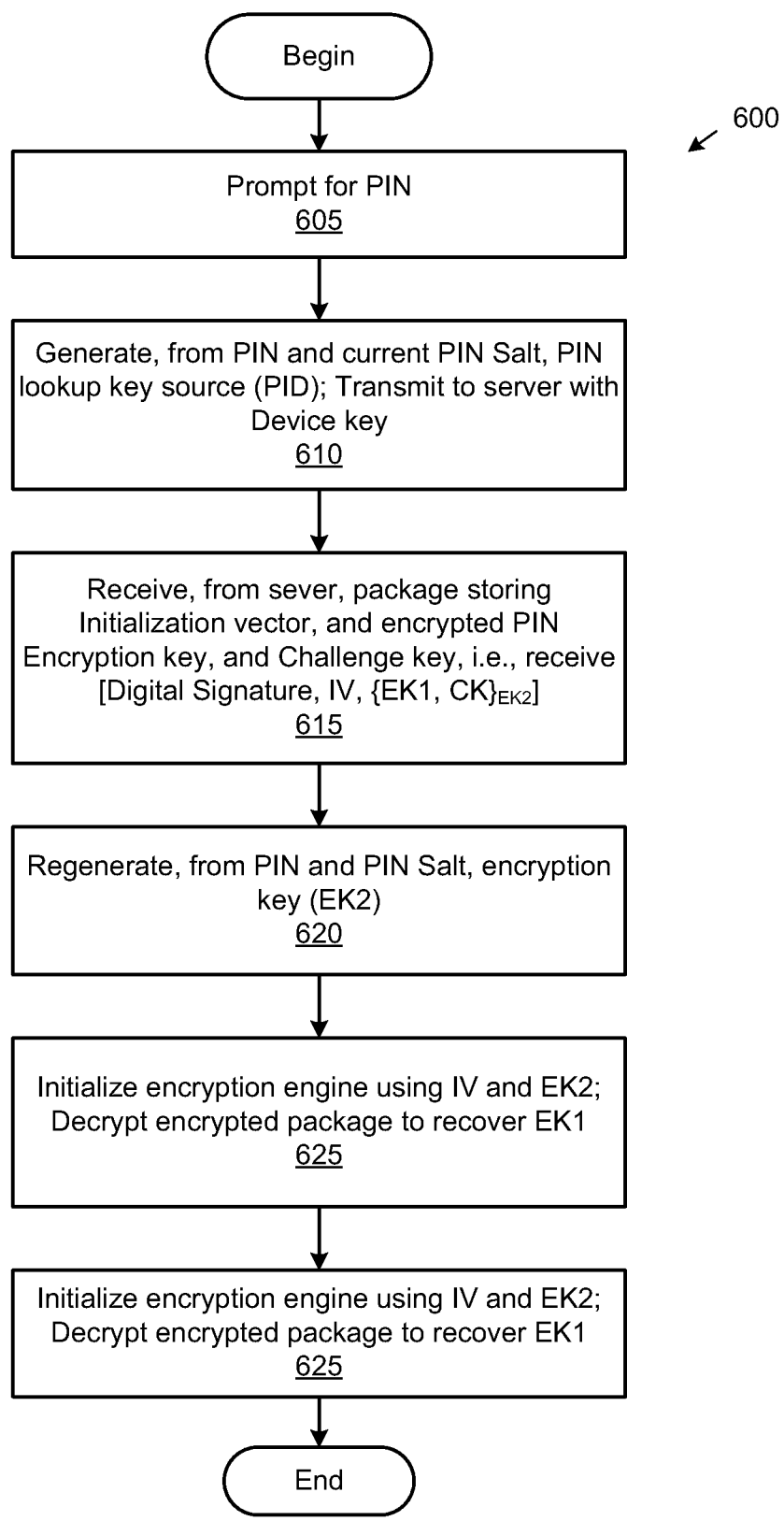
FIG. 6 illustrates a method for accessing encrypted data on a mobile device using a PIN authentication process, according to one embodiment.

More specifically, FIG. 6 illustrates a method 600 for accessing encrypted data on a mobile device using a device-based PIN authentication process, according to one embodiment. As shown, the method 600 begins at step 605, where the mobile device prompts a user to supply the PIN value.

Once received, at step 610, the mobile device regenerates the PIN lookup key (PID) using the received PIN value and current salt value. The resulting PIN lookup key (PID) along with the device ID are sent to the server. Assuming the PIN was entered correctly, at step 615, the server returns an encrypted package (corresponding to the PIN lookup key (PID) and device ID). The encrypted package stores, the encrypted PIN encryption key (EK1), the initialization vector and, optionally, a challenge key.

At step 620, the mobile device regenerates, from the PIN and current salt, the encryption key (EK2). For example, the PIN and salt may be input to the password based key derivation function PBKDF2 to generate key source data bytes. In such a case, a signature of the package may be verified using 23 bytes of the key source data and the other 32 bytes used as the encryption key (EK2). At step 625, the mobile device initializes the encryption engine using the regenerated encryption key EK2 and the initialization vector stored with the encrypted package. Once initialized the encryption engine recovers EK1 from the encrypted package. At step 630, the encryption engine is initialized using the recovered PIN encryption key (EK1) and corresponding initialization value. Thereafter the encryption engine can decrypt the package storing the encrypted vault key, i.e., the engine recovers the vault key (VK), allowing the vault data to be decrypted.

In addition, in one embodiment, the mobile device may rotate the salt value as well as generate new key source data bytes (resulting in a new EK2 and HMAC signing key) and generate a new PID lookup key, all following a successful login using the PIN value. The mobile device sends the new PID lookup key to the server, updates the salt stored in the client key store, and re-encrypts and re-signs the PIN encryption key (EK1) using the new encryption key (EK2) and HMAC signing key (HK) derived from the new key source data. The resulting encrypted PIN encryption key is then transmitted to the server, in the same manner described above. Doing so configures the system for the next time the user wishes to access the encrypted vault key using the PIN value.

Figure 7:
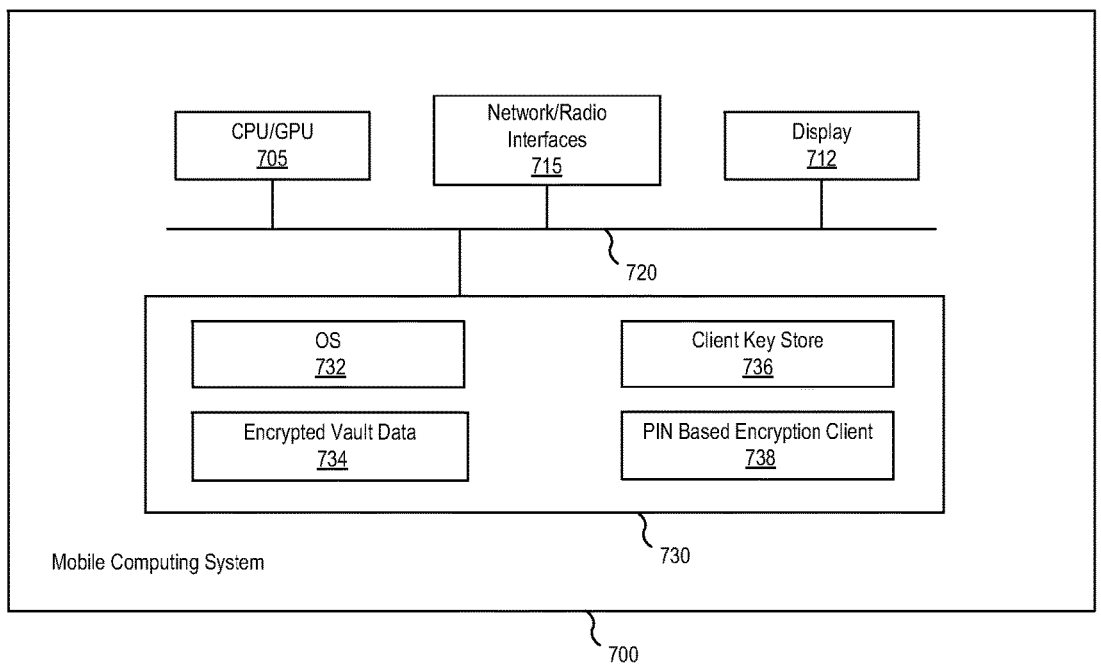
FIG. 7 illustrates an example mobile device configured to use a PIN authentication process, according to one embodiment.

FIG. 7 illustrates an example mobile computing system 700 configured to use a PIN authentication process, according to one embodiment. In this example, computing system 700 is included to be representative of a mobile telephone device (commonly referred to as a Smartphone) with a touch sensitive display 712. Of course, embodiments of the invention may be adapted for use with a variety of computing devices, including PDAs, handheld video game systems, tablet computers, and other computing devices, including conventional PC or laptop computers.

As shown, mobile computing system 700 includes, without limitation, a central processing unit and graphics processing unit (CPU/GPU) 705, network/radio interfaces 715, an interconnect 720, and a memory 730. Of course, mobile computing systems include a variety of additional hardware and software components. The CPU/GPU 705 retrieves and executes programming instructions and application data stored in the memory 730. The interconnect 720 is used to transmit instructions and data between the CPU/GPU, storage 730, network interfaces 715, and memory 730. CPU/GPU 705 is included to be representative of a single CPU, multiple CPUs, a single CPU having multiple processing cores, and the like. And the memory 730 is generally included to be representative of memory and storage on a mobile device, e.g., DDR and flash memory spaces.

Illustratively, the memory 730 includes a mobile operating system (O/S) 732, encrypted vault data 734, client key store 736, and PIN-based encryption client 738. The mobile O/S 732 provides software configured to control the execution of application programs on the computing system 700. The PIN-based encryption client 738 generally provides a software application configured to access encrypted vault data 734 using the methods discussed above. Accordingly, the PIN-based encryption client 738 is configured to generate the encryption keys, encrypt and decrypt data, manage the salt and initialization vectors, and sign and verify encrypted packages as discussed above. Importantly, the PIN-based encryption client 738 is configured to generate, and then encrypt, the PIN encryption key (EK1) and send the resulting encrypted package to the server. As described above, the client key store 736 stores the device key (DK) and current PIN salt along with the encrypted vault key.

Figure 8:
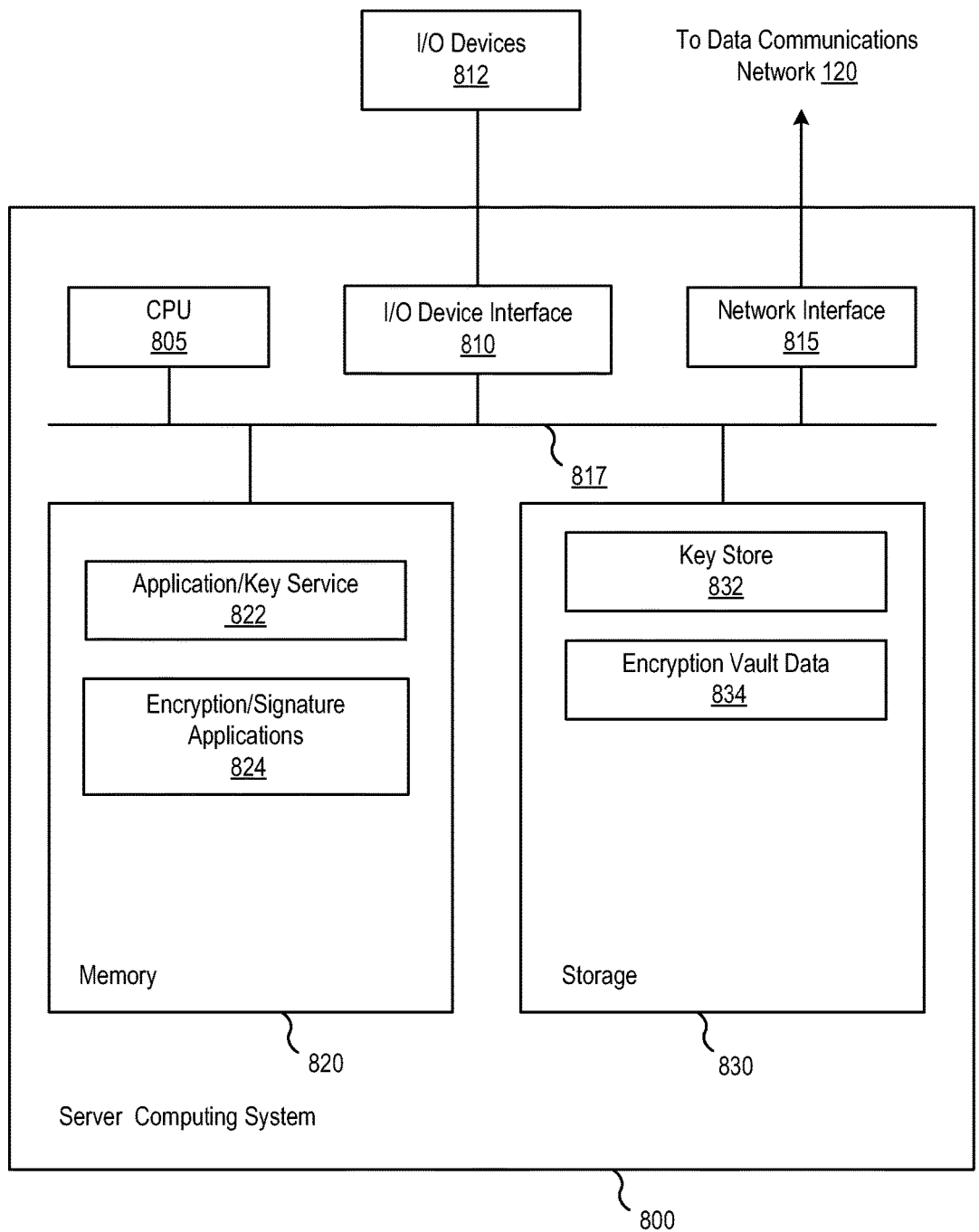
FIG. 8 illustrates an example computing system used to store an encrypted PIN encryption key, according to one embodiment.

FIG. 8 illustrates an example computing system 800 used to store an encrypted PIN encryption key, according to one embodiment. As shown, the computing system 800 includes, without limitation, a central processing unit (CPU) 805, a network interface 815, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes a key service 822 and encryption/signature applications 824 and memory 830 stores a key store 832 and encrypted vault data 834. The key service 822 generally provides software applications configured to respond to PIN based requests for access to encrypted PIN encryption keys stored in the key store 832 using the methods discussed above. Accordingly, the key service 822 is configured to communicate with a mobile device to receive and store an encrypted payload; namely, to store the encrypted the PIN encryption key (EK1) along with the associated signatures and initialization vectors. The encrypted PIN encryption key (EK1) may be stored in the key store 832, along with the corresponding device ID and PIN lookup key (PID). Additionally, the key service 822 may be configured to receive a PIN lookup key (PID) and device ID and attempt to match it to an encrypted PIN encryption key (EK1) stored in the key store 832. Provided a match is found, the key service 822 returns the encrypted PIN encryption key (EK1) to a requesting mobile device, as described above. The encryption signature applications 824 may be used to verify the signatures as well as send challenge requests and verify challenge responses received from a client device requesting access to encrypted vault data 834.

As described, embodiments presented herein provide a device-based PIN authentication process used to protect encrypted data stored on a computing system, e.g., a tablet or mobile device. In one embodiment, a client component and a server component each store distinct components needed to access the encrypted data on the client. Specifically, the client stores a vault encryption key, encrypted using a PIN encryption key (EK1). The PIN encryption key (EK1) itself is encrypted using another key (EK2) derived from the PIN value and stored on the server. Because the key needed to decrypt the vault key (i.e., EK1) is stored on the server (encrypted using the key derived from the PIN (i.e., EK2)), protections such as rate limiting can be used to prevent a brute force attack on the PIN as well as remote deletion of server data, lockout or deletion of data after a configurable number of unsuccessful attempts, etc.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. As discussed above, e.g., the server used to store the encrypted PIN encryption key (EK1) may be hosted by a cloud-based computing infrastructure.

While the foregoing is directed to embodiments of the present invention, other and further embodiments of the invention may be devised without departing from the basic scope thereof, and the scope thereof is determined by the claims that follow.

What is claimed is:

1. A computer-implemented method for securely storing encrypted data on a computing device that includes a microprocessor and memory, the method comprising:
   receiving a data encryption key derived from a password, wherein the data encryption key is used to encrypt data on the computing device;
   encrypting the data encryption key using a first encryption key;
   storing the encrypted data encryption key on the computing device;
   encrypting the first encryption key using a second encryption key,
   wherein the second encryption key is derived from a user-supplied value entered on the computing device and a salt input to a password key based derivation function, and
   wherein the salt is rotated following a request to access the encrypted data on the computing device, and
   wherein the user-supplied value is different from the password; and
   sending the encrypted first encryption key to a remote server.

2. The method of claim 1, further comprising:
   generating, from the user supplied value, a lookup key;
   generating a device key; and
   sending the lookup key and the device key to the remote server,
   wherein remote server uses the device key and the lookup key as an index to the encrypted first encryption key stored on the server.

3. The method of claim 2, further comprising:
   in response to the request to access encrypted data stored on the computing device:
   regenerating, using the user-supplied value, the lookup key and the second encryption key;
   sending the regenerated lookup key and the device key to the remote server;
   in response, receiving the encrypted first encryption key from the remote server;
   decrypting, using regenerated second encryption key, the encrypted first encryption key received from the remote server to recover the first encryption key; and
   decrypting, using recovered first encryption key, the encrypted data encryption key stored on the client device.

4. The method of claim 1, wherein the user-supplied value is a PIN value.

5. The method of claim 1, wherein the computing device is a mobile computing device.

6. A non-transitory computer-readable storage medium storing instructions, which, when executed on a microprocessor, performs an operation for securely storing encrypted data on a computing device that includes memory and the microprocessor, the operation comprising:
   receiving a data encryption key derived from a password, wherein the data encryption key is used to encrypt data on the computing device;
   encrypting the data encryption key using a first encryption key;
   storing the encrypted data encryption key on the computing device;
   encrypting the first encryption key using a second encryption key,
   wherein the second encryption key is derived from a user-supplied value entered on the computing device and a salt input to a password key based derivation function, and
   wherein the salt is rotated following a request to access the encrypted data on the computing device, and
   wherein the user-supplied value is different from the password; and
   sending the encrypted first encryption key to a remote server.

7. The computer-readable storage medium of claim 6, wherein the operation further comprises:
   generating, from the user supplied value, a lookup key;
   generating a device key; and
   sending the lookup key and the device key to the remote server,
   wherein remote server uses the device key and the lookup key as an index to the encrypted first encryption key stored on the server.

8. The computer-readable storage medium of claim 7, wherein the operation further comprises:

in response to the request to access encrypted data stored on the computing device:
  regenerating, using the user-supplied value, the lookup key and the second encryption key;
  sending the regenerated lookup key and the device key to the remote server;
  in response, receiving the encrypted first encryption key from the remote server;
  decrypting, using regenerated second encryption key, the encrypted first encryption key received from the remote server to recover the first encryption key; and
  decrypting, using recovered first encryption key, the encrypted data encryption key stored on the client device.

9. The computer-readable storage medium of claim 6, wherein the user-supplied value is a PIN value.

10. The computer-readable storage medium of claim 6, wherein the computing device is a mobile computing device.

11. A computing device, comprising:
  a microprocessor and
  a memory hosting an application, which, when executed on the microprocessor, performs an operation for securely storing encrypted data on the computing device, the operation comprising:
    receiving a data encryption key derived from a password,
    wherein the data encryption key is used to encrypt data on the computing device,
    encrypting the data encryption key using a first encryption key,
    storing the encrypted data encryption key on the computing device,
    encrypting the first encryption key using a second encryption key,
    wherein the second encryption key is derived from a user-supplied value entered on the computing device and a salt input to a password key based derivation function, and
    wherein the salt is rotated following a request to access the encrypted data on the computing device, and
    wherein the user-supplied value is different from the password, and
    sending the encrypted first encryption key to a remote server.

12. The computing device of claim 11, wherein the operation further comprises:
  generating, from the user supplied value, a lookup key;
  generating a device key; and
  sending the lookup key and the device key to the remote server,
  wherein remote server uses the device key and the lookup key as an index to the encrypted first encryption key stored on the server.

13. The computing device of claim 12, wherein the operation further comprises:
  in response to the request to access encrypted data stored on the computing device:
    regenerating, using the user-supplied value, the lookup key and the second encryption key;
    sending the regenerated lookup key and the device key to the remote server;
    in response, receiving the encrypted first encryption key from the remote server;
    decrypting, using regenerated second encryption key, the encrypted first encryption key received from the remote server to recover the first encryption key; and
    decrypting, using recovered first encryption key, the encrypted data encryption key stored on the client device.

14. The computing device of claim 11, wherein the user-supplied value is a PIN value.

* * * * *